Patented July 15, 1947

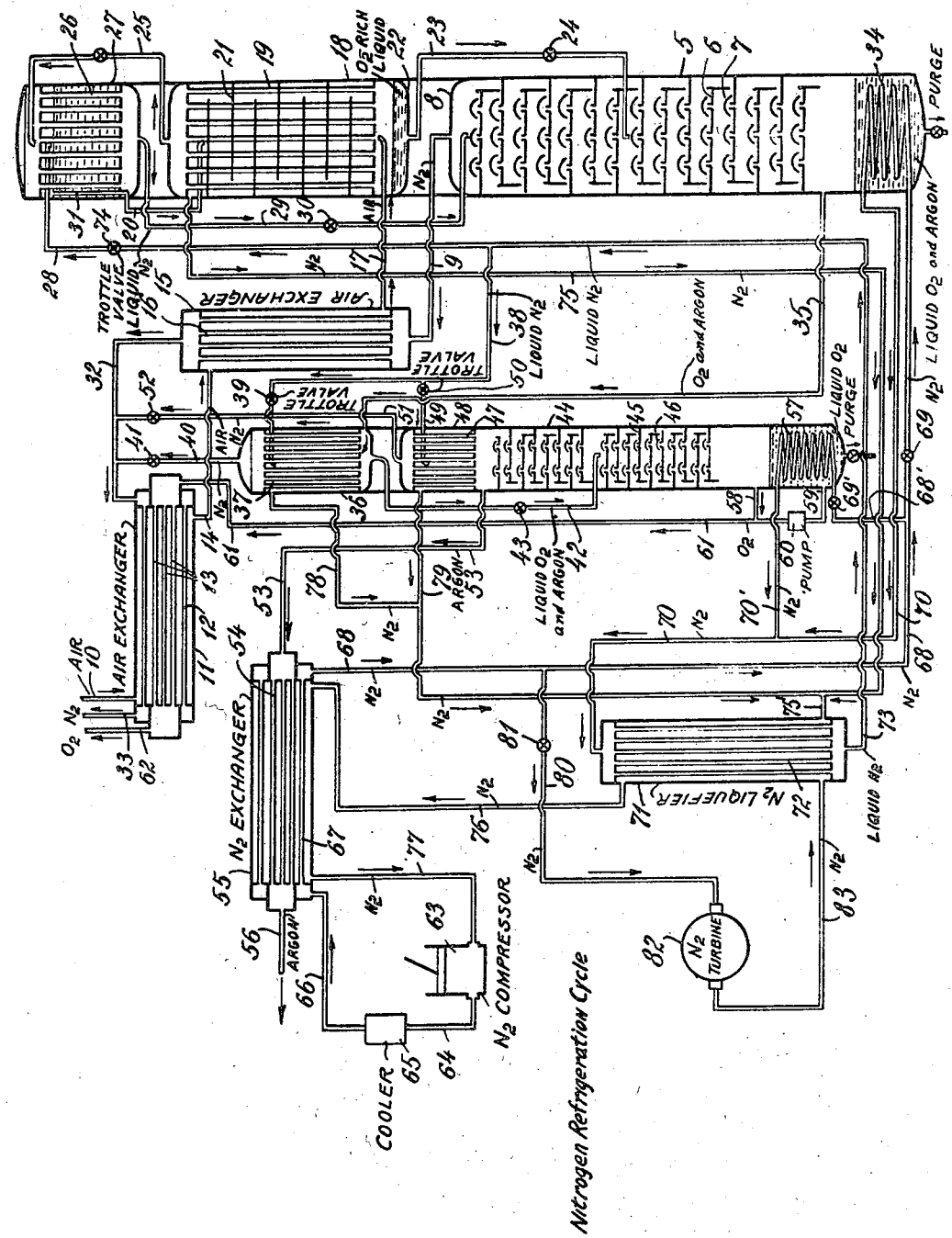

2,424,201

UNITED STATES PATENT OFFICE 2,424,201

SEPARATION OF THE CONSTITUENTS OF GASEOUS MIXTURES

Claude C. Van Nuys, Greenwich, Conn., assignor to Air Reduction Company, Incorporated, New York, N. Y., a corporation of New York Application February 19, 1944, Serial No. 523,076

18 Claims. (Cl. 62—175.5)

1

This invention relates to the liquefaction and separation of ternary gaseous mixtures for the purpose of recovering the constituents thereof. The method is particularly adapted for the separation of the principal constituents of air, although it may be applied to other ternary mixtures, the constituents of which have different boiling points.

Various methods for the recovery of the constituents of ternary gaseous mixtures have been proposed heretofore. These methods may accomplish the desired purpose, but are subject to certain disadvantages including incidental losses and particularly the cost of the energy employed in compressing the gaseous mixture.

It is the object of the present invention to provide a highly efficient method involving minimum expense whereby the constituents of a gaseous mixture such as air may be recovered in a commercially practicable manner.

Another object of the invention is the provision of a method whereby the three desired constituents of the mixture are each separated and recovered in substantial purity.

Other objects and advantages of the invention will be apparent as it is better understood by reference to the following specification and the accompanying drawing, which illustrates diagrammatically an apparatus adapted for use in practising the invention.

It is to be understood that in the drawing no attempt has been made to illustrate those details of liquefaction apparatus which are well known in the art, the purpose of the drawing being merely to assist the reader to a complete comprehension of the essential features of the invention.

In order to clarify the description, reference will be made to a ternary mixture such as air consisting of nitrogen, oxygen and argon. The constituents neon, krypton and xenon occur in such relatively small amounts that no consideration need be given thereto in respect to the separation hereinafter described. Ternary mixtures having constituents the physical characteristics of which are related as in the case of nitrogen, oxygen and argon, may be similarly treated to effect the desired separation.

It is an important advantage of the present invention that the three constituents are each recovered in substantial purity and that all of such constituents present in the gaseous mixture treated are recovered. A further advantage arises from the fact that the gaseous mixture treated, for example air, is not utilized to any extent to maintain the refrigeration necessary to the successful operation of the procedure. A separate refrigeration cycle is utilized. Hence the gaseous mixture, for example air, entering the system, need be compressed only to relatively low pressures, for example a pressure not exceeding 5 atmospheres absolute. Many of the losses incidental to procedures as previously known have been due to the utilization of the gaseous mixture undergoing separation as the refrigerating medium.

In the application of the invention to the separation of the constituents of air, three products are obtained; namely, (1) substantially pure nitrogen with only minute percentages of oxygen and practically no argon; (2) oxygen of industrial purity containing less than 0.5% of impurities of any sort; (3) practically all of the argon originally present in the air with only small percentages of oxygen and no nitrogen.

To attain this result, the separation is effected in a relatively simple manner. After initial compression to a relatively low pressure, the air is cooled in exchangers by heat interchange with products of the separation. Thereafter it is separated into two liquid fractions by heat exchange with liquid nitrogen and the vapor therefrom provided as hereinafter described. The separation affords a fraction enriched in oxygen, usually containing approximately 47% of oxygen, and a liquid consisting of nitrogen. The two liquids are then rectified to afford an effluent consisting of pure nitrogen and a vapor phase containing all of the oxygen, all of the argon, and a small proportion of nitrogen. At this point the nitrogen effluent is withdrawn as one of the products to be supplemented with nitrogen recovered from the vapor phase, consisting principally of oxygen and argon.

The vapor phase is withdrawn and subjected initially to selective liquefaction by heat exchange with liquid nitrogen. By this means most of the residual nitrogen is separated from a liquid consisting principally of oxygen and argon which may, however, still contain some slight proportion of nitrogen. The separated nitrogen is withdrawn and added to the effluent from the initial rectification.

The liquid, consisting of oxygen and argon, is then subjected to an auxiliary rectification. The vapor at the top of the rectification consists of argon which may still include a slight percentage of nitrogen as an impurity. It is therefore subjected to selective condensation by heat exchange with liquid nitrogen, which affords a reflux liquid consisting of pure argon. The residual nitrogen which is thus separated is delivered to the effluent from the primary rectification. The provision of the reflux liquid consisting of pure argon assures a pure argon vapor which may be withdrawn as one of the products from the auxiliary rectification. The liquid accumulating at the bottom of the auxiliary rectification is pure oxygen. It may be withdrawn as a liquid or vaporized and delivered as a vapor from the rectification.

As will be readily apparent from the foregoing description, the three constituents are recovered in substantial purity. Moreover, none of the constituents is lost, since there is no impure waste gas or mixture of gases which must be discharged from the system. The procedure ensures an efficient and economical separation and recovery of the several constituents of the mixture.

As already indicated, the method does not rely upon compression of the gaseous mixture to be separated to afford the necessary refrigeration. The liquid nitrogen which is utilized to maintain the requisite low temperatures at the places required in the system is provided by compression of nitrogen which is circulated in an independent cycle. After compression and cooling, the nitrogen is liquefied. The liquid nitrogen is delivered to the several condensers where it performs its function in cooling the gaseous mixture and the constituents thereof. The nitrogen liquid is vaporized and the vapor, after giving up its cold, is recompressed and again utilized for refrigeration of the system. Although it is not essential, a portion of the nitrogen may be expanded from its initial pressure in a suitable expansion engine or turbine to afford the additional refrigerative effect, depending upon expansion of the gas with external work.

The details of the invention will be better understood by reference to the following description and the drawing, in which 5 indicates a rectification column having trays 6 and the usual bubble caps 7. The column 5 is closed at its top by a diaphragm 8 and an outlet 9 is connected thereto to deliver the effluent nitrogen which is separated in the rectification of air.

The air is introduced, after initial compression, and cooling, through a pipe 10 to an exchanger 11 and circulates about the tubes 12 and 13 therein, being cooled by products of the separation delivered thereto as hereinafter described. The air passes through a pipe 14 to an exchanger 15 and is further cooled in traveling about the tubes 16 of the exchanger by heat interchange with products of the separation.

The cooled air is delivered by a pipe 17 to a condenser 18 above the column 5 and passes through tubes 19 thereof in heat exchange relation with liquid nitrogen and vapors thereof supplied through a pipe 20. The liquid nitrogen flows over baffles 21 and is vaporized while the air flowing through the tubes 19 is subjected to selective liquefaction. As a result, liquid enriched in oxygen is delivered to the collector 22 and thence through a pipe 23 and valve 24 to an intermediate level of the column 5.

The residue from the condenser 18 is delivered through a pipe 25 to the tubes 26 of a condenser 27 which is supplied with liquid nitrogen through a pipe 28. The residual nitrogen in the tubes 26 is liquefied and delivered through a pipe 29 and valve 30 to the upper level of the column 5 affording reflux nitrogen for the rectification. The surplus liquid nitrogen and vapors therefrom escape from the condenser 27 through an overflow 31 to the pipe 20.

The effluent, consisting of nitrogen withdrawn through the pipe 9, passes through the tubes 10 of the condenser 15, thence through a pipe 32 to the tubes 12 of the exchanger 11, and is withdrawn through a pipe 33 and delivered to any suitable storage receptacle. This constitutes one of the major products of the separation. The nitrogen is substantially pure, since the rectification in the column 5 is so conducted that all of the oxygen and argon accumulate in the bottom of the column 5.

The liquid accumulating in the bottom of the column 5, consisting principally of oxygen and argon, is vaporized by gaseous nitrogen circulating through a coil 34, as hereinafter described, to afford vapor in the column and also the vapor which is withdrawn through a pipe 35. The vapor thus withdrawn includes all of the oxygen and argon initially present in the air treated. It is delivered to a condenser 36 and passes upwardly through tubes 37 thereof, being subjected to heat exchange with liquid nitrogen supplied through a pipe 38 and throttle valve 39. In thus passing through the tubes 37, the gaseous mixture is liquefied except for residual nitrogen which escapes through a pipe 40 and valve 41 to the pipe 32 where it joins the effluent from the primary rectification. The liquid consisting of oxygen and argon with possibly some relatively small proportion of nitrogen, is delivered through the pipe 42 and valve 43 to a rectifier 44 which is provided with the usual trays 45 and bubble caps 46.

As the liquid flows downwardly through the column, it is gradually enriched in oxygen, whereas the vapors rising through the column are enriched in argon and carry also any small proportion of nitrogen which may be present. The vapors pass upwardly through tubes 47 of a condenser 48 which is supplied with liquid nitrogen through a pipe 49 and throttle valve 50. The liquid, consisting of argon, flows backwardly onto the upper tray of the column 44, and nitrogen escapes through a pipe 51 and valve 52 to the pipe 32, joining the effluent nitrogen from the initial rectification.

Owing to the provision of the pure argon reflux derived from the tubes 47, the vapor withdrawn through a pipe 53 is pure argon and is delivered to the tubes 54 of an exchanger 55 and withdrawn through a pipe 56 and delivered to any suitable storage receptacle. This affords the second product of the operation.

The liquid accumulating in the bottom of the column 44 is vaporized by nitrogen passing through a coil 57 supplied as hereinafter described, to afford the vapor necessary in the column, and, if desired, to permit withdrawal of oxygen vapor through a pipe 58. Liquid oxygen may, however, be withdrawn through a pipe 59 and delivered by a pump 60 to a pipe 61 which carries the oxygen to the tubes 13 of the exchanger 11. The oxygen is withdrawn from the exchanger through a pipe 62 and is delivered to any suitable storage receptacle. This completes the separation by affording the third constituent of the air treated.

To provide necessary refrigeration, nitrogen is compressed in a compressor 63 and is delivered by a pipe 64 to a cooler 65 and thence by a pipe 66 to the exchanger 55. It passes through the tubes 67 of the exchanger, being thereby cooled by the argon and also by nitrogen vapor returning in the cycle as hereinafter described.

The cooled nitrogen is delivered by a pipe 68 controlled by a valve 69 to the coil 34 at the bottom of the column 5, and being partially liquefied in the coil 34, is returned by a pipe 70 to a liquefier 71. Another portion of the nitrogen may be delivered to the coil 57 by branch 68' controlled by a valve 69' and returned to the pipe 70 by a branch 70'. The nitrogen passes through the tubes 72 of the liquefier in heat exchange relation with cold nitrogen vapors, and the liquid is withdrawn through a pipe 73 which delivers part of it to the throttle valve 74 and thence to the pipe 26 which supplies the condenser 27, the remainder passing through the pipe 38 as hereinbefore described.

Nitrogen vapor from the condenser 18 is returned through a pipe 75 and branch 75' to the liquefier 71. After passing through the liquefier, the nitrogen vapor is delivered by a pipe 76 to the exchanger 55 and after circulating about the tubes 54 and 57, it is delivered by a pipe 77 to the compressor 63 for further use in the cycle.

Liquid nitrogen is supplied to the condensers 36 and 48 by the pipe 38 which is connected to the pipe 73. Nitrogen vapor from the condenser 36 returns through a pipe 78 which joins a pipe 79 delivering nitrogen vapor from the condenser 48. This nitrogen vapor enters the liquefier 71 with the nitrogen vapor returning through the pipe 75.

While it is not essential to the system, in large installations it may be desirable to expand some of the compressed nitrogen in an expansion engine or turbine. For that purpose, a pipe 80 controlled by a valve 81 may be connected to the pipe 68 and to an engine or turbine 82. The nitrogen expanded to a lower pressure with external work may be delivered through the pipe 83 to the liquefier 71 to afford additional refrigeration applicable to the liquefaction of the nitrogen in the cycle. In smaller plants, expansion with external work will not be feasible because of the limitation of practicable sizes of expansion engines and turbines adapted for this purpose.

The nitrogen may be compressed in the compressor 63 to any suitable pressure adapted to afford the necessary refrigeration to maintain the cycle. This necessary refrigeration will depend upon various leakage losses and other factors. Usually it will not be necessary to compress the nitrogen to pressures as high as those frequently used in systems where the gaseous mixture under separation is utilized as the refrigerating medium, that is, 15–20 atmospheres absolute. The use of a separate nitrogen cycle for refrigeration introduces marked efficiency in the operation of the system because less expenditure of work is necessary to effect the separation.

Moreover, as already indicated, the method as described ensures maximum recovery of the three desired constituents with minimum losses of such constituents and particularly the avoidance of contamination of the desired constituents with others. Thus, nitrogen-free argon is highly desirable for certain industrial purposes. Pure nitrogen and pure oxygen also have wide uses, and freedom from impurities is an important requirement in respect to these gases. The procedure permits the production of all three constituents in the desired purity and simultaneously.

Various changes may be made in the details of the procedure and in the apparatus employed without departing from the invention or sacrificing the advantages thereof.

I claim:
1. The method of separating the constituents of ternary gaseous mixtures which comprises liquefying the gaseous mixture in two fractions, rectifying the two fractions to separate an effluent consisting of the most volatile constituent in substantial purity, withdrawing a vapor phase consisting of all of the other two constituents and a small proportion of the most volatile constituent, subjecting the withdrawn vapor phase to selective liquefaction to provide a gaseous effluent consisting of the most volatile constituent in substantial purity and a liquid consisting substantially of the other two constituents and rectifying the latter liquid to separate and recover the constituents thereof.

2. The method of separating the constituents of ternary gaseous mixtures which comprises liquefying the gaseous mixture in two fractions, by indirect heat exchange with liquid nitrogen, rectifying the two fractions to separate an effluent consisting of the most volatile constituent in substantial purity, withdrawing a vapor phase consisting of all of the other two constituents and a small proportion of the most volatile constituent, subjecting the withdrawn vapor phase to selective liquefaction to provide a gaseous effluent consisting of the most volatile constituent in substantial purity and a liquid consisting substantially of the other two constituents and rectifying the latter liquid to separate and recover the constituents thereof.

3. The method of separating the constituents of ternary gaseous mixtures which comprises liquefying the gaseous mixture in two fractions, rectifying the two fractions to separate an effluent consisting of the most volatile constituent in substantial purity, withdrawing a vapor phase consisting of all of the other two constituents and a small proportion of the most volatile constituent, subjecting the withdrawn vapor phase to selective liquefaction to provide a gaseous effluent consisting of the most volatile constituent in substantial purity and a liquid consisting substantially of the other two constituents, rectifying the latter liquid to separate and recover the constituents thereof and supplying refrigeration as required to maintain the operation by compressing and liquefying nitrogen in a separate cycle and vaporizing the liquid nitrogen by indirect heat exchange with the gaseous mixture and the vapor phase containing two of the constituents thereof.

4. The method of separating the constituents of ternary gaseous mixtures which comprises subjecting the compressed and cooled gaseous mixture to liquefaction and a primary rectification to separate a liquid and an effluent consisting of the most volatile constituent, vaporizing the liquid, subjecting the vapor to selective liquefaction to separate an additional portion of the most volatile constituent in substantial purity and rectifying the resulting liquid to separate and recover the constituents thereof.

5. The method of separating the constituents of ternary gaseous mixtures which comprises subjecting the compressed and cooled gaseous mixture to liquefaction and a primary rectification to separate a liquid and an effluent consisting of the most volatile constituent, vaporizing the liquid, subjecting the vapor to selective liquefaction to separate an additional portion of the most volatile constituent in substantial purity, rectifying the resulting liquid to separate and recover the constituents thereof, and utilizing liquid nitrogen by indirect heat exchange to effect liquefaction of the gaseous mixture and selective liquefaction of the vapor.

6. The method of separating the constituents of ternary gaseous mixtures which comprises subjecting the compressed and cooled gaseous mixture to liquefaction and a primary rectification to separate a liquid and an effluent consisting of the most volatile constituent, vaporizing the liquid, subjecting the vapor to selective liquefaction to separate an additional portion of the most volatile constituent in substantial purity, rectifying the resulting liquid to separate and recover the constituents thereof, and maintaining the refrigeration necessary in separating the constituents of the vapor by indirect heat exchange with liquid nitrogen.

7. The method of separating the constituents of ternary gaseous mixtures which comprises subjecting the gaseous mixture to selective liquefaction and the residue to total liquefaction thereby affording two liquids, rectifying the liquids to separate a liquid and an effluent consisting of the most volatile constituent, vaporizing the liquid and subjecting the vapor initially to selective liquefaction and the liquid product thereof to an auxiliary rectification to separate and to recover the constituents thereof.

8. The method of separating the constituents of ternary gaseous mixtures which comprises subjecting the gaseous mixture to selective liquefaction and the residue to total liquefaction thereby affording two liquids, rectifying the liquids to separate a liquid and an effluent consisting of the most volatile constituent, vaporizing the liquid, subjecting the vapor initially to selective liquefaction and the liquid product thereof to an auxiliary rectification to separate and to recover the constituents thereof, and providing reflux liquid for the auxiliary rectification by heat exchange of vapors therefrom with liquid nitrogen.

9. The method of separating the constituents of ternary gaseous mixtures which comprises subjecting the gaseous mixture to selective liquefaction and the residue to total liquefaction thereby affording two liquids, rectifying the liquids to separate a liquid and an effluent consisting of the most volatile constituent, vaporizing the liquid and subjecting the vapor initially to selective liquefaction by heat exchange with liquid nitrogen and the liquid product thereof to an auxiliary rectification to separate and to recover the constituents thereof.

10. The method of separating the constituents of ternary gaseous mixtures which comprises subjecting the compressed and cooled gaseous mixture to liquefaction and a primary rectification to separate a liquid and an effluent consisting of the most volatile constituent, vaporizing the liquid, subjecting the vapor to selective liquefaction and the liquid product thereof to an auxiliary rectification to separate the remaining constituents of the original mixture.

11. The method of separating the constituents of ternary gaseous mixtures which comprises subjecting the compressed and cooled gaseous mixture to liquefaction and a primary rectification to separate a liquid and an effluent consisting of the most volatile constituent, vaporizing the liquid, subjecting the vapor to selective liquefaction and the liquid product thereof to an auxiliary rectification to separate the remaining constituents of the original mixture, and maintaining the refrigeration required for the initial and auxiliary rectifications with liquid nitrogen produced in a separate cycle.

12. The method of separating nitrogen, oxygen and argon from air which comprises liquefying the air in two fractions, rectifying the liquid fractions to separate an effluent consisting of nitrogen, thereby producing a liquid containing all of the oxygen and argon of the air with a small proportion of nitrogen, vaporizing the liquid, subjecting the vapor to selective liquefaction to eliminate nitrogen and to produce a liquid consisting essentially of oxygen and argon and rectifying the liquid to separate oxygen and argon.

13. The method of separating nitrogen, oxygen and argon from air which comprises liquefying the air in two fractions, rectifying the liquid fractions to separate an effluent consisting of nitrogen, thereby producing a liquid containing all of the oxygen and argon of the air with a small proportion of nitrogen, vaporizing the liquid, subjecting the vapor to selective liquefaction to eliminate nitrogen and to produce a liquid consisting essentially of oxygen and argon and rectifying the liquid with a reflux provided by liquefying vapors from the rectification to separate oxygen and argon.

14. The method of separating nitrogen, oxygen and argon from air which comprises liquefying the air in two fractions by indirect heat exchange with liquid nitrogen, rectifying the liquid fractions to separate an effluent consisting of nitrogen, thereby producing a liquid containing all of the oxygen and argon of the air with a small proportion of nitrogen, vaporizing the liquid, subjecting the vapor to selective liquefaction to eliminate nitrogen and to produce a liquid consisting essentially of oxygen and argon and rectifying the liquid to separate oxygen and argon.

15. The method of separating nitrogen, oxygen and argon from air which comprises subjecting the compressed and cooled air to liquefaction and a primary rectification to separate a liquid containing oxygen, argon and nitrogen and an effluent consisting of nitrogen, vaporizing the liquid, subjecting the vapor to selective liquefaction and the liquid product thereof to an auxiliary rectification to separate argon and oxygen therefrom.

16. The method of separating the constituents of ternary gaseous mixtures which comprises liquefying the gaseous mixture in two fractions, rectifying the two fractions to separate an effluent consisting of the most volatile constitutent in substantial purity, withdrawing a vapor phase consisting of the other two constituents and a small proportion of the most volatile constituent, subjecting the withdrawn vapor phase to selective liquefaction to provide a gaseous effluent consisting of the most volatile constituent in substantial purity and a liquid consisting substantially of the other two constituents and rectifying the latter liquid to separate and recover the constituents thereof.

17. The method of separating the constituents of ternary gaseous mixtures which comprises liquefying the gaseous mixture in two fractions, by indirect heat exchange with liquid nitrogen, rectifying the two fractions to separate an effluent consisting of the most volatile constituent in substantial purity, withdrawing a vapor phase consisting of the other two constituents and a small proportion of the most volatile constituent, subjecting the withdrawn vapor phase to selective liquefaction to provide a gaseous effluent consisting of the most volatile constituent in substantial purity and a liquid consisting substantially of the other two constituents and rectifying the latter liquid to separate and recover the constituents thereof.

18. The method of separating the constituents of ternary gaseous mixtures which comprises liquefying the gaseous mixture in two fractions, rectifying the two fractions to separate an effluent consisting of the most volatile constituent in substantial purity, withdrawing a vapor phase consisting of the other two constituents and a small proportion of the most volatile constituent, subjecting the withdrawn vapor phase to selective liquefaction to provide a gaseous residue consisting of the most volatile constituent in substantial purity and a liquid consisting substantially of the other two constituents, rectifying the latter liquid to separate and recover the constituents thereof and supplying refrigeration as required to maintain the operation by compressing and liquefying nitrogen in a separate cycle and vaporizing the liquid nitrogen by indirect heat exchange with the gaseous mixture and the vapor phase containing two of the constituents thereof.

CLAUDE C. VAN NUYS.

REFERENCES CITED

The following references are of record in the file of this patent:

UNITED STATES PATENTS

| Number | Name | Date |
| --- | --- | --- |
| 1,880,981 | Pollitzer et al. | Oct. 4, 1932 |
| 2,012,080 | De Baufre | Aug. 20, 1935 |
| 1,088,052 | Aumont | Feb. 24, 1914 |
| 1,619,909 | Wilkinson | Mar. 8, 1927 |